US00RE35580E

United States Patent [19]

Heider et al.

[11] E Patent Number: Re. 35,580

[45] Reissued Date of Patent: Aug. 12, 1997

[54] TRAILER CONSTRUCTION

[76] Inventors: Merle J. Heider, 203 12th St. SW.; Dale J. Heider, 1108 Eighth Ave. SW.; Leon J. Heider, 1107 Third Ave. SW.; Craig J. Heider, 812 S. Taft St., all of Humboldt, Iowa 50548

[21] Appl. No.: 306,492

[22] Filed: Nov. 16, 1994

Related U.S. Patent Documents

Reissue of:

[64] Patent No.: 5,326,156
Issued: Jul. 5, 1994
Appl. No.: 901,125
Filed: Jun. 19, 1992

[51] Int. Cl.[6] ..... B60P 1/56

[52] U.S. Cl. ..... 298/24; 280/789; 296/184; 298/7; 298/27

[58] Field of Search ..... 105/247; 296/184; 298/7, 27, 28, 24, 29, 31, 32, 33, 34, 35 R; 280/789

[56] References Cited

U.S. PATENT DOCUMENTS

| | | | |
|---|---|---|---|
| 1,807,447 | 5/1931 | Smith . | |
| 1,908,684 | 5/1933 | Buchanan . | |
| 3,139,286 | 6/1964 | Johnson | 280/5 |
| 3,310,345 | 3/1967 | Rowden | 280/789 X |
| 3,419,310 | 12/1968 | Gramlich | 298/8 |
| 3,883,148 | 5/1975 | Miller | 280/5 |
| 4,058,239 | 11/1977 | Van Mill | 298/7 X |
| 4,070,059 | 1/1978 | Ksenych | 298/1 V |
| 4,227,732 | 10/1980 | Kish | 298/35 R X |
| 4,258,953 | 3/1981 | Johnson | 298/27 |
| 4,348,047 | 9/1982 | Harshman | 298/27 X |

OTHER PUBLICATIONS

Copy supplied during prosecution of parent application S.N. 07/901,125.

*Primary Examiner*—Karen B. Merritt
*Assistant Examiner*—Janice L. Krizek
*Attorney, Agent, or Firm*—Zarley, McKee, Thomte, Voorhees, & Sease

[57] ABSTRACT

An improved tractor-trailer assembly utilizes a trailer bottom wall having a drop center portion which is located rearwardly of the longitudinal midpoint of the trailer. The bottom wall of the cargo container is attached to and suspended from the upper edges of the side wall of the trailer. In one form of the invention, the bottom wall has a rectangular cross-sectional configuration, and in another form of the invention, the bottom wall has an arcuate U-shaped cross-sectional configuration.

12 Claims, 3 Drawing Sheets

TRAILER CONSTRUCTION

Matter enclosed in heavy brackets [ ] appears in the original patent but forms no part of this reissue specification; matter printed in italics indicates the additions made by reissue.

BACKGROUND OF THE INVENTION

The present invention relates to a tractor-trailer construction and specifically to a construction for over-the-road trailers used to carry bulk materials such as grain.

One problem [encoutnered]*encountered* with present trailers of the type described above is the difficulty in distributing the weight of the cargo to the various axles of the vehicle in proportions which meet state and federal regulations while at the same time maximizing the cargo load being carried. This is particularly important in a tractor-trailer combination which utilizes a pair of tandem axles at the rear of the trailer, and a single axle at the rear of the tractor whicc pulls the trailer. Current regulations require that the weight on the tandem axle not exceed 34,000 pounds and that the weight on the single axle at the rear of the tractor not exceed 20,000 pounds.

Present trailers for carrying grain use a drop center configuration which centers the lowermost portion of the cargo bin equally between the rear tandem axles or the trailer and the rear single axle of the tractor. This causes the weight to be distributed nearly equally between the tandem axle at the rear of the trailer and the rear axle of the tractor. In the prior trailers, because the rear axle of the tractor has a maximum load limit of 20,000 pounds this maximum is met before the rear tandem axle achieves its maximum permissible limit of 34,000 pounds. Thus, in many present devices, the cargo carried by the trailer is substantially reduced due to the fact that the maximum 20,000 pound load limit of the rear tractor axle is achieved before the maximum 34,000 pound load limit for the rear tandem axle of the trailer.

Also, because of the various load limits permitted for each axle of the vehicle, it is desirable to minimize the weight of the trailer itself so that more weight can be utilized for the cargo which is being carried.

Most prior art trailers for carrying bulk materials utilize an inclined bottom wall having a drop center portion intermediate the opposite ends of the bottom wall. The bottom wall is welded at its sides to the sidewalls of the trailer. However, during the welding process, distortion occurs at the sidewalls of the trailer resulting in a less attractive appearance of the completed trailer. Another problem encountered with present trailers results from the twisting or distortion of the trailer as it passes over irregular terrains. The welding of the bottom wall of the trailer to the sidewalls of the trailer can cause distortion or damage to the sidewalls of the trailer as the trailer flexes while passing over irregular terrain.

Therefore a primary object of the present invention is the provision of an improved trailer construction.

A further object of the present invention is the provision of an improved trailer construction which permits distribution of the weight of the cargo in the trailer in such a manner as to maximize the amount of cargo which can be carried under various state and federal axle load requirements.

A further object of the present invention is the provision of an improved trailer construction which suspends the bottom wall of the cargo container from the upper edges of the sidewalls of the trailer so as to eliminate the need for welding the sides of the bottom wall to the sidewalls of the trailer.

A further object of the present invention is the provision of an improved trailer construction having a bottom wall which is curved in cross section so as to reduce the weight of the trailer.

A further object of the present invention is the provision of an improved trailer construction which utilizes a bottom wall of minimum weight and which does not require reinforcing members as in present trailer constructions.

A further object of the present invention is the provision of an improved trailer construction having a side discharge chute which will permit the contents of the trailer to be discharged into an auger conveyor. Prior hopper trailers require a drive over pit or an unloading auger having a swing auger or portable auger that can be moved underneath the trailer as the grain is discharged from the bottom of the trailer. With the side discharge chute of the present invention one can unload just by driving alongside of an auger conveyor. This makes the trailer more practical to use on a farm.

A further object of the present invention is the provision of an improved trailer construction which is economical to manufacture, durable in use, and efficient in operation.

SUMMARY OF THE INVENTION

The present invention utilizes a trailer frame supported by a tandem axle and wheel assembly at its rear end. The forward end is adapted to be mounted to the fifth wheel of an over-the-road tractor having a single rear axle which bears the load of the front end of the trailer.

Within the trailer is a drop center cargo container having a bottom wall which commences at the forward and rear ends of the trailer and progresses downwardly and centrally to a middle drop center portion. The drop center portion is positioned rearwardly from the longitudinal midpoint of the trailer so that the cargo's weight is distributed in a greater proportion to the tandem axle at the rear of the trailer than it is to the single axle at the rear of the tractor.

In the preferred embodiment, the overall length of the trailer is approximately thirty feet, and the drop center construction is positioned approximately two feet to the rear of the longitudinal center point of the trailer. By utilizing this rearwardly offset construction, it is possible to fill the trailer cargo container to a point where the rear tandem axle of the trailer and the rear single axle of the tractor achieve their maximum load limits at approximately the same time. This will permit the maximizing of the load which can be carried in the cargo. Current regulations permit 34,000 pounds to be borne by the rear tandem axle, and permit 20,000 pounds to be borne by the rear single axle of the tractor. By offsetting the drop center of a thirty-foot trailer approximately two feet, it is possible to distribute the weight of the cargo so that the 34,000 pound limit of the tandem axles and the 20,000 pound limit of the single axle are reached at approximately the same time. In prior devices, the 20,000 pound limit would be reached before the 34,000 pound limit would be reached, thereby resulting in a lower cargo weight which could by carried.

Another feature of the present invention is the suspension of the bottom wall of the cargo container from the upper edges of the sidewalls, rather than welding the bottom wall to the sidewalls as in prior devices. This suspension can be accomplished in two ways. One way of suspending the bottom wall is to utilize a pair of attachment plates which have their lower edges attached to the bottom wall, and which have their upper edges welded to the upper edges of the sidewalls of the trailer. As a result of this construction, the attachment plates suspend the bottom wall of the container from the upper edges of the sidewalls of the container.

Another form of the invention utilizes a bottom wall construction which is arcuate in cross section and which includes side edges extending upwardly in U-shaped configuration to be attached by welding or other attachment means to the upper edges of the sidewalls of the container. The use of an arcuate or U-shaped cross-sectional configuration eliminates the need for reinforcing members underneath the bottom surface of the bottom wall, thereby reducing the weight of the trailer and permitting a cargo of slightly greater weight to be achieved.

Another feature of the present invention is the provision of a trailer having one or more side discharge chutes which permit the contents of the trailer to be discharged into an auger conveyor while the trailer is positioned alongside of the auger conveyor.

The suspended bottom wall, the curved bottom wall, and the side discharge chute discribed above can be utilized with trailers of any length. The rear offset feature described above is intended primarily for use in a thirty-foot trailer having a rear tandem axle assembly used in combination with a tractor having a single rear axle.

DESCRIPTION OF THE PREFERRED EMBODIMENT

Figure 1:
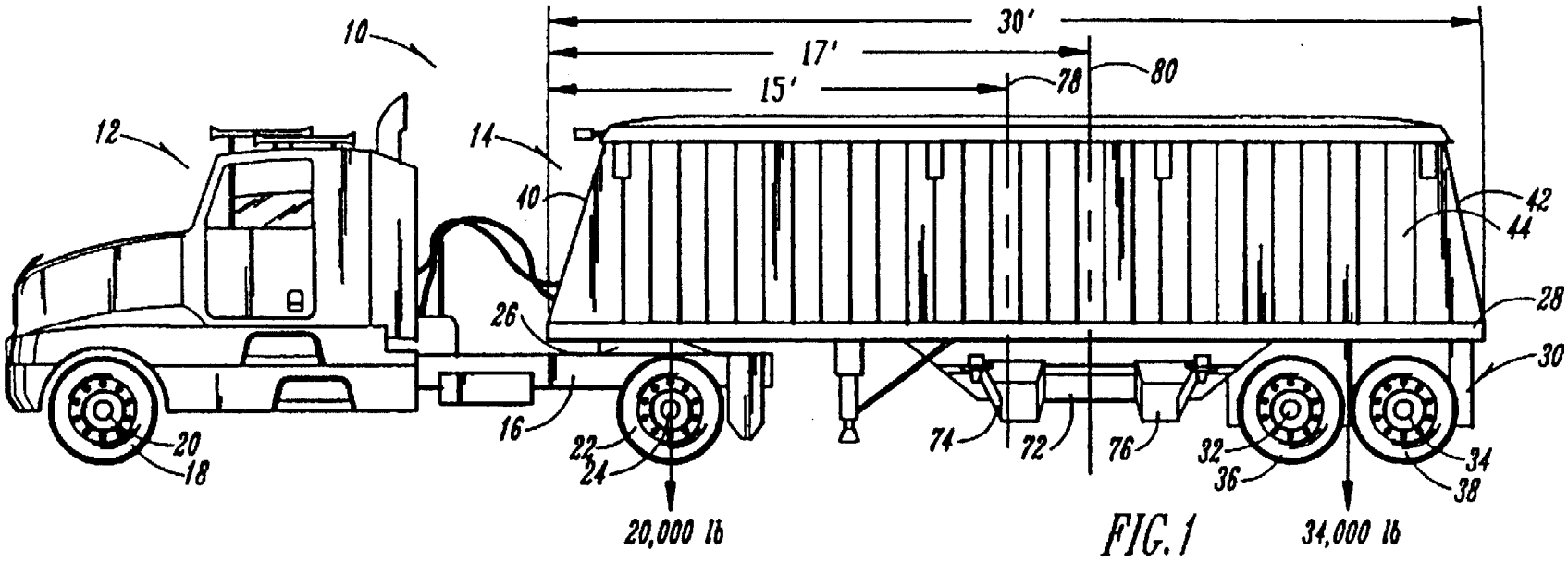
FIG. 1 is an elevational view of a tractor-trailer combination of the present invention.

Referring to the drawings, the numeral 10 generally designates a tractor-trailer assembly comprising a tractor 12 and a trailer 14. Tractor 12 includes a tractor frame 16 having front wheels 18 and a front axle 20. Tractor frame 16 is supported at its rear end by a rear wheel 22 and a rear axle 24. Mounted to tractor frame 16 is a conventional fifth wheel 26.

Trailer 14 includes a trailer frame 28 having a tandem wheel and axle assembly 30 at its rear end. Tandem wheel and axle assembly 30 includes two axles 32, 34 and two wheels 36, 38.

The tractor-trailer assembly 10 shown in FIG. 1 is of the type which typically uses a thirty-foot trailer. In this type of tractor-trailer combination, the assembly 10 includes two tandem axles 32, 34 at the rear of the trailer, and the tractor 12 includes a single rear axle 24.

Under current regulations for the load limits on various axles, a trailer of this type can carry a load of 34,000 pounds at the rear tandem axle assembly, and can carry a load of 20,000 pounds on the single wheel and axle assembly 22, 24.

Trailer 14 includes a front exterior wall 40, a back exterior wall 42, and a pair of exterior sidewalls 44, 46. Each sidewall 44, 46 includes an upper edge member 48. Mounted between sidewalls 44, 46 is a bottom wall 50 having a front inclined portion 52, a rear inclined portion 54, and a middle portion 56. The middle portion 56 provides a drop center configuration for a cargo container 57. Extending transversely across bottom wall 50 on the undersurface thereof are a plurality of C-shaped cross supports 58 which provide reinforcement and strength to the wall 50.

Figure 3:
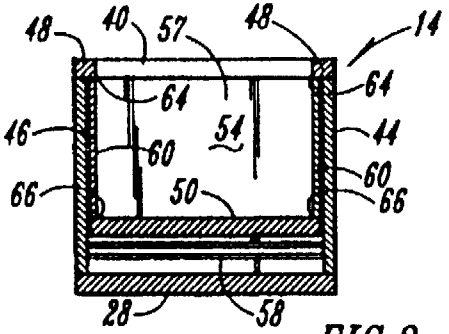
FIG. 3 is a sectional view taken along line 3—3 of FIG. 2.
Figure 4:
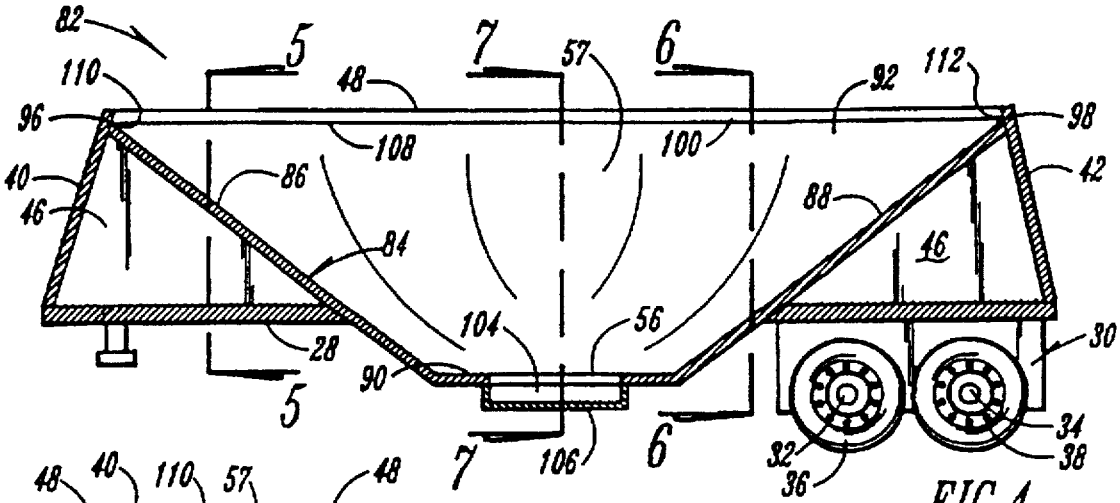
FIG. 4 is a sectional view of a modified form of the present invention.

A pair of front attachment plates 60 each have their upper edges welded by means of a weld seam 64 to the upper edge member 48 of one of the sidewalls 44, 46 (See FIG. 3). The lower edges of front attachment plate 60 are welded to the side edges of bottom wall 50 along a lower weld seam 66.

A pair of rear attachment plates 62 are similarly connected at their lower edges to bottom wall 50 by means of a lower weld seam 70 and are connected at their upper edges to the upper edge member 48 of sidewalls 44, 46 by means of an upper weld seam 68. This configuration results in the bottom wall 50 being suspended from the upper edge members 48 of sidewalls 44, 46.

Figure 9:
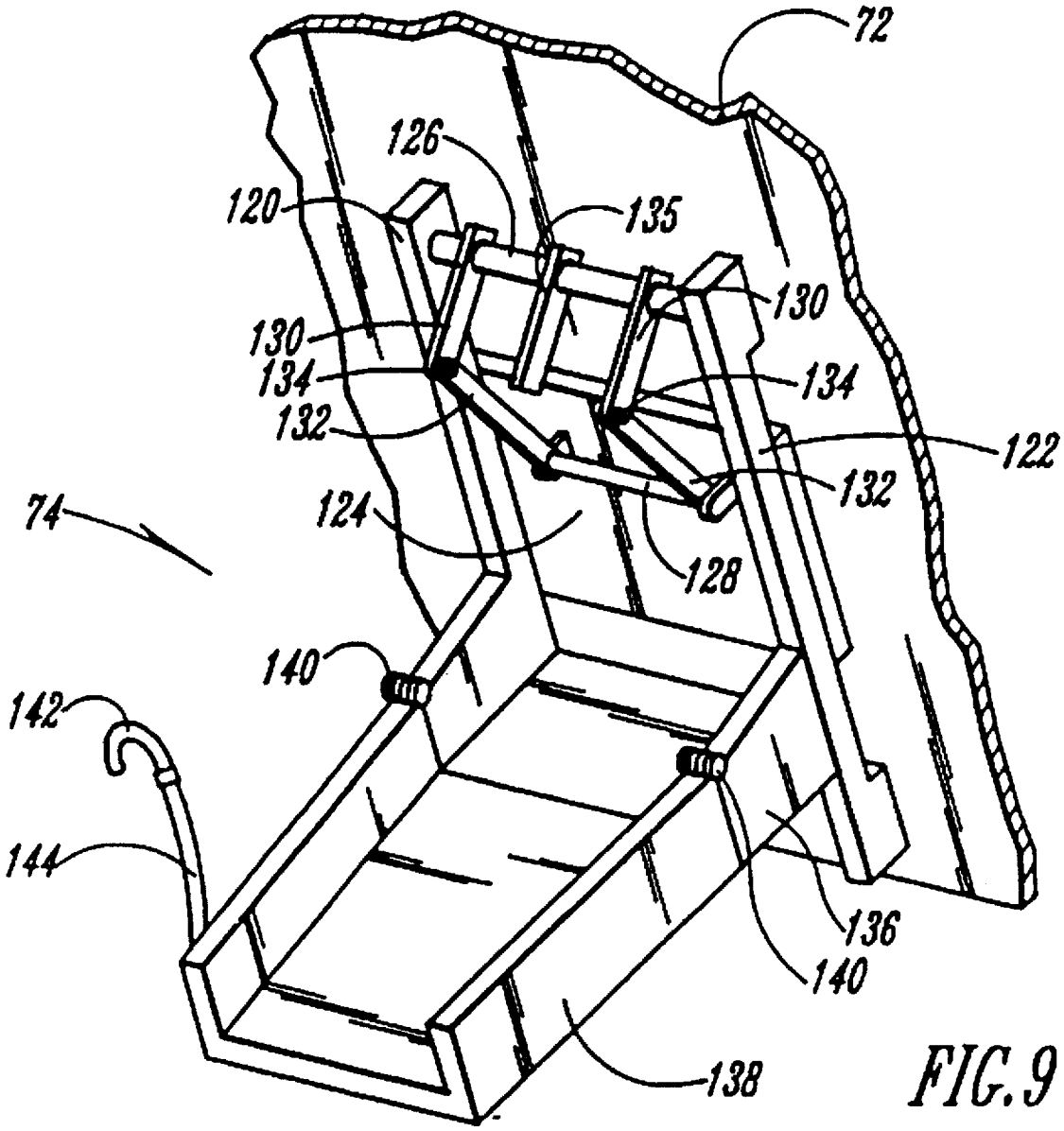
FIG. 9 is a detail perspective view showing the discharge chute of the present invention.

Adjacent the middle portion 56 of bottom wall 50 are a pair of angled side plates 72 which funnel the contents of the cargo container 57 to a pair of side discharge chutes 74, 76 (FIGS. 1 and 9). The detail structure of side discharge chute 74 is shown in FIG. 9 and includes a pair of spaced apart parallel support brackets 120, 122 which are welded or otherwise secured to the angled side plate 72. Slidably mounted between support brackets 120, 122 and side plate 72 is a sliding door 124 which can slide vertically from its closed position shown in FIG. 9 to an open position wherein it exposes a discharge opening (not shown). Sliding door 124 is moved by a toggle system comprising an upper rotatable shaft 126, a lower rotatable shaft 128, a pair of upper toggle links 130, and a pair of lower toggle links 132. Toggle links 130, 132 are pivotally joined by pivotal link connection 134. A lever handle 135 is fixedly attached to upper rotatable shaft 126 for rotating the shaft 126 to cause the toggle links to pull the sliding door 124 from its closed position shown in FIG. 9 to an elevated open position.

Attached to support brackets 120, 122 is a fixed chute section 136. A pivoting chute section 138 is pivotally attached to fixed chute section 136 by means of a pivot pin 140. A cable 142 having a hook 144 on the end thereof may be hooked over the upper shaft 126 to cause the folding chute section 138 to be held in an elevated position during nonuse.

Side chutes 74, 76 permit the trailer 14 to be used to fill a typical auger conveyor used on farms. The trailer is pulled alongside of the auger conveyor, and the side chutes can be used to empty the contents of the trailer into the auger conveyor.

The center 80 of the middle portion 56 of bottom wall 50 is offset approximately two feet from the longitudinal midpoint 78 of the trailer 14. This causes the weight of the cargo to be distributed more heavily toward the tandem axles 32, 34 than toward the single rear axle 24 of the tractor 12. It has been found with a thirty-foot trailer, that such offsetting permits the weight to be distributed between the rear tandem axles 32, 34 and the rear single axle 24 in a ratio of approximately 17:10. Thus, as the cargo container is being filled, the rear tandem axle 32, 34 will achieve their maximum permissible limit of 34,000 pounds at approximately the same time that the rear single axle 24 achieves its maximum load limit of 20,000 pounds.

In prior art centered configurations, the weight of the rear single axle 24 of tractor 12 achieves its 20,000 pound load limit before the rear tandem axles 32, 34 achieve their maximum load limit of 34,000. The result is that the total amount of cargo which is permitted to be carried in prior devices is substantially less than the total amount of cargo which can be carried by the present invention.

Referring to FIGS. 4–8, a modified form 82 of the present invention is shown. Parts of trailer 82 which are identical to corresponding parts in trailer 14 have been identified with the same numerals. The bottom wall configuration, however, is different in the modified form shown in FIGS. 4–8. This bottom wall 84 includes a forward inclined portion 86, a rear inclined portion 88, a low middle portion 90, and a pair of curved side portions 92, 94. The entire bottom wall included a horizontal upper perimetric edge formed by edges 96, 98, 100, 102.

At the bottom of the bottom wall 84 is a discharge opening 104 having a discharge chute 106 mounted thereover.

The bottom wall 84 is secured to the upper edge members 48 of sidewalls 44, 46 by means of an elongated side weld gain 108 which joins the upper side edges 100, 102 of bottom wall 84 to the upper edge members 48 of sidewalls 44, 46. Similarly, the front edge 96 is welded to the front wall 40 by means of a front weld seam 110, and the rear edge 98 is attached to the rear wall 42 by means of a rear weld seam 112.

While welding is shown as the preferred method for attaching the bottom walls 50, 84 to sidewalls 44, 46, other fastening means can be used such as bolts, rivets, or the like.

Figure 2:
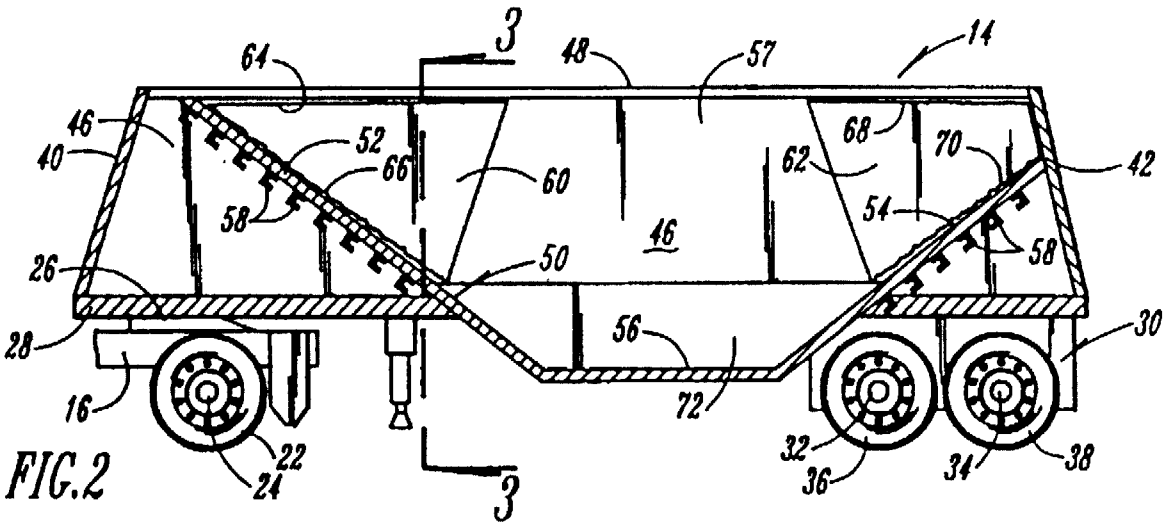
FIG. 2 is a sectional view showing the internal configuration of the trailer.
Figure 5:
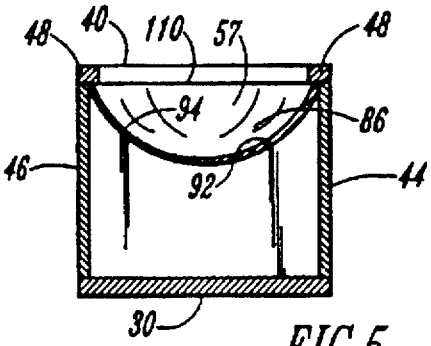
FIGS. 5, 6, and 7 are sectional views taken along lines 5—5, 6—6, and 7—7 respectively of FIG. 4.
Figure 6:
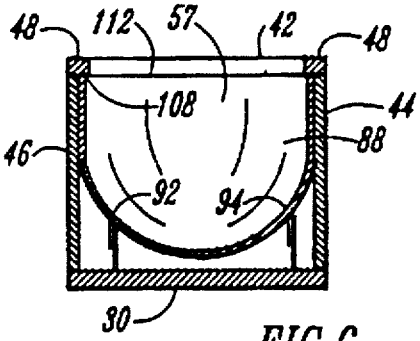
Figure 7:
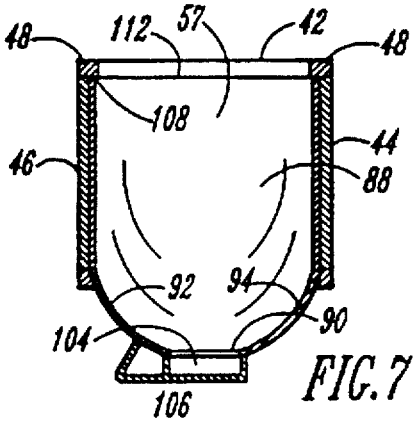
Figure 8:
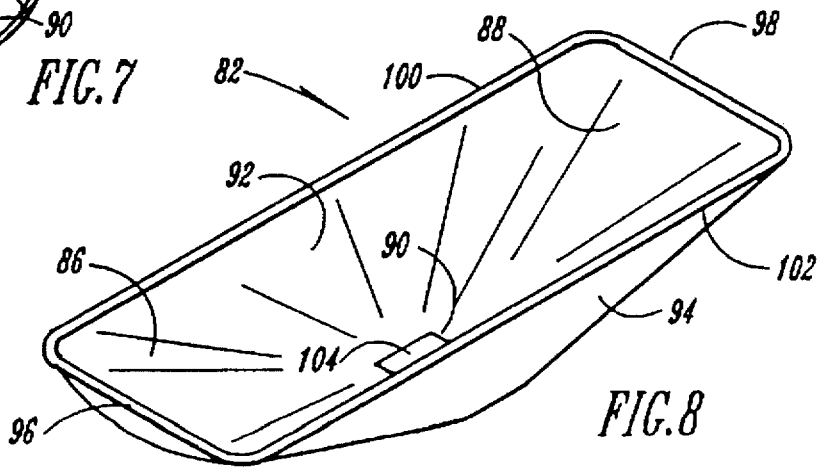
FIG. 8 is a perspective view showing the bottom wall construction of the trailer of FIG. 4.

As can be seen in FIGS. 5, 6, and 7, the bottom wall 84 is arcuate or U-shaped in configuration. This causes the load of the cargo to be evenly distributed along the bottom wall 84 and prevents bucking or bowing of the bottom wall 84. Accordingly, the C-shaped members 58 shown in the device of FIG. 2 are not required in the curved bottom wall 84 shown in FIGS. 4–8. This reduces the overall weight of the trailer, thereby making possible a larger cargo weight. Every pound of weight saved in the trailer means another pound of cargo that can be carried, thereby making the haul more profitable for the owner.

Another advantage of the rounded configuration shown in FIGS. 4–8 is that the grain or other cargo will flow freely towards the lower most portion of the cargo container where the discharge opening 104 is located. In square cross-sectional configured trailers, many types of bulk materials will tend to hang up or accumulate in the corners of the trailer thereby making emptying of the trailer more difficult.

The preferred embodiment of the invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit or scope of the invention as further defined in the following claims.

We claim:

1. An improvement in a tractor-trailer assembly comprising a trailer frame having front and rear ends, a tandem wheel and axle assembly connected to and supporting said trailer frame adjacent said rear end thereof, a tractor frame having a front wheel and axle assembly and a rear wheel and single axle assembly spaced apart from one another, and a fifth wheel positioned between said front wheel and axle assembly and said rear wheel and single axle assembly, coupling means detachably coupling said front end of said trailer frame to said fifth wheel whereby first, second, and third portions of the load carried by said trailer frame are transferred to a supporting surface through said tandem axle and wheel assembly, said rear wheel and single axle assembly, and said front wheel and axle assembly, respectively; said improvement comprising:

a pair of elongated sidewalls attached to said frame in spaced parallel relation to one another;

an elongated bottom wall between said pair of sidewalls and combining therewith to form a carrying compartment;

said bottom wall having a longitudinal axis, a forward end, a rear end, a front sloping portion, a rear sloping portion, and an intermediate portion, said front and rear sloping portions extending from said front and rear bottom wall ends respectively in a downwardly inclined direction toward said intermediate portion, said intermediate portion being between said front and rear inclined portions and being offset rearwardly from the longitudinal midpoint of said trailer frame, whereby the weight of a cargo within said carrying compartment will be distribute dina grater magnitude to said tandem wheel and axle assembly of said trailer frame than to said rear wheel and single axle assembly of said tractor frame;

said intermediate portion of said bottom wall being positioned so that said weight of said cargo is distributed between said tandem wheel and axle assembly of said trailer frame and said rear wheel and single axle assembly of said tractor frame at a ratio of approximately 17:10.

2. [An] *The* improvement according to claim 1 wherein said trailer frame is approximately thirty feet long and the longitudinal midpoint of said intermediate portion of said bottom wall is offset rearwardly a distance of approximately two feet from said midpoint of said trailer frame.

3. An improvement in a tractor trailer assembly comprising a trailer frame having front and rear ends, a tandem wheel and axle assembly connected to and supporting said trailer frame adjacent said rear end thereof, a tractor frame having a front wheel and axle assembly and a rear wheel and single axle assembly spaced apart from one another, and a fifth wheel positioned between said front wheel and axle assembly and said rear wheel and single axle assembly, coupling means detachably coupling said front end of said trailer frame to said fifth wheel whereby first, second and third portions of the load carried by said trailer frame are transferred to a supporting surface through said tandem axle and wheel assembly, said rear wheel and single axle assembly, and said front wheel and axle assembly, respectively; said improvement comprising:

a pair of elongated sidewalls attached to said frame in spaced parallel relation to one another;

an elongated bottom wall between said pair of sidewalls and combining therewith to form a carrying compartment;

said bottom wall having a longitudinal axis, a forward end, a rear end, a front sloping portion, a rear sloping portion, and an intermediate portion, said front and rear sloping portions extending from said front and rear bottom wall ends respectively in a downwardly inclined direction toward said intermediate portion, said intermediate portion being between said front and rear inclined portions and being offset rearwardly from the longitudinal midpoint of said trailer frame, whereby the weight of a cargo within said carrying compartment will be distributed in a grater magnitude to said tandem wheel and axle assembly of said trailer frame than to said rear wheel and single axle assembly of said tractor frame;

said sidewalls each including an upper longitudinal edge, attachment means attaching said bottom wall to said upper edges of said sidewalls whereby the weight of said cargo on said bottom wall is born by said longitudinal upper edges of said sidewalls.

4. [An] *The* improvement according to claim 3 and further comprising said attachment means being welded to said upper edges of said sidewalls.

5. [An] *The* improvement according to claim 4 wherein said bottom wall includes two opposite side edges, said attachment means being operatively attached to said opposites side edges of said bottom wall.

6. [An] *The* improvement according to claim 5 wherein said attachment means comprise first and second attachment plates each having a top edge and a bottom edge, said top edges of said first and second attachment plates each being attached to a respective one of said upper edges of one of said sidewalls and said bottom edges of said [fist] *first* and second attachment plates each being attached to one a respective of said opposite side edges of said bottom wall.

7. An improvement in a tractor trailer assembly comprising a trailer frame having front and rear ends, a tandem wheel and axle assembly connected to and supporting said trailer frame adjacent said rear end thereof, a tractor frame having a front wheel and axle assembly [an] *and* a rear wheel and single axle assembly spaced apart from one another, and a fifth wheel positioned between said front wheel and axle assembly and said rear wheel and single axle assembly, coupling means detachably coupling said front end of said trailer frame to said fifth wheel whereby first, second, and third portions of the load carried by said trailer frame are transferred to a supporting surface through sad tandem axle and wheel assembly, said rear wheel and single axle assembly, and said front wheel and axle assembly, respectively; said improvement comprising:

a pair of elongated sidewalls attached to said frame in spaced parallel relation to one another;

an elongated bottom wall between said pair of sidewalls and combining therewith to form a carrying compartment;

said bottom wall having a longitudinal axis, a forward end, a rear end, a front sloping portion, a rear sloping portion, and an intermediate portion, said front and rear sloping portions extending from said front and rear bottom wall ends respectively in a downwardly inclined direction toward said intermediate portion, said intermediate portion being between said front and rear inclined portions and being offset rearwardly from the longitudinal midpoint of said trailer frame, whereby the weight of a cargo within said carrying compartment will be distributed in a greater magnitude to said tandem wheel and axle assembly of said trailer frame than to said rear wheel and single axle assembly of said tractor frame;

said opposite sidewalls each having an elongated upper edge and said bottom wall comprising first and second opposite side edges, each of said first and second side edges of said bottom wall being attached to a respective one of said upper edges of said sidewalls.

8. [An] *The* improvement according to claim 7 wherein said bottom wall in cross section taken transversely to the longitudinal axis thereof comprises an arcuate U-shape between said first and second opposite side edges of said bottom wall.

*9. An improvement in a trailer assembly comprising a trailer frame having front and rear ends and a wheel and axle assembly connected to and supporting said trailer frame adjacent said rear end thereof, said improvement comprising:*

*a pair of elongated side walls attached to said frame in spaced apart relation to one another, each of said side walls having an upper longitudinal edge;*

*an elongated bottom wall between said pair of side walls and combining therewith to form a carrying compartment, said bottom wall having a longitudinal axis, a forward end, a rear end, a front sloping portion, an intermediate portion, a rear sloping portion and a pair of opposite lateral edges, said front and rear sloping portions extending from said forward and rear ends respectively of said bottom wall in a downwardly inclined direction toward said intermediate portion;*

*first and second attachment plates each having upper and lower plate edges, each of said upper plate edges of said first and second attachment plates being immovably fixedly attached to one of said upper longitudinal edges of said side walls respectively and each of said lower plate edges being immovably fixedly attached to one of said opposite lateral edges of said bottom wall so as to cause the weight of said bottom wall to be suspended from said upper longitudinal edges of said side walls.*

*10. An improvement according to claim 9 wherein said lateral edges of said bottom wall are directly affixed to said lower plate edges of said attachment plates by fastening means selected from the group consisting essentially of welding, bolts or rivets.*

*11. An improvement in a trailer assembly comprising a trailer frame having front and rear ends and a wheel and axle assembly connected to and supporting said trailer frame adjacent said rear end thereof, said improvement comprising:*

*a pair of elongated side walls attached to said frame in spaced apart relation to one another, each of said side walls having an upper longitudinal edge;*

*an elongated bottom wall between said pair of side walls and combining therewith to form a carrying compartment;*

*said bottom wall having an upper perimetric edge, said bottom wall also having a forward sloping portion, a rear sloping portion, and a pair of opposite side portions extending downwardly from said upper perimetric edge;*

*said upper perimetric edge of said bottom wall being connected to said upper longitudinal edges of said pair of elongated side walls whereby said entire bottom wall extends below and is suspended from said upper longitudinal edges of said pair of elongated side walls;*

*said entire bottom wall being positioned between said pair of elongated side walls and having an arcuate shape when viewed in cross section taken transversely to a longitudinal axis of said trailer frame.*

*12. The improvement of claim 11 wherein said upper perimetric edge of said bottom wall is fixedly attached to said upper longitudinal edges of said pair of elongated side walls.*

* * * * *